US011488349B2

(12) United States Patent
Glen et al.

(10) Patent No.: US 11,488,349 B2
(45) Date of Patent: Nov. 1, 2022

(54) METHOD AND APPARATUS FOR ALPHA BLENDING IMAGES FROM DIFFERENT COLOR FORMATS

(71) Applicant: ATI TECHNOLOGIES ULC, Markham (CA)

(72) Inventors: David I.J. Glen, Toronto (CA); Keith Lee, Toronto (CA)

(73) Assignee: ATI TECHNOLOGIES ULC, Markham (CA)

( * ) Notice: Subject to any disclaimer, the term of this patent is extended or adjusted under 35 U.S.C. 154(b) by 0 days.

(21) Appl. No.: 16/455,947

(22) Filed: Jun. 28, 2019

(65) Prior Publication Data

US 2020/0410748 A1    Dec. 31, 2020

(51) Int. Cl.
*G06T 15/50* (2011.01)
*G06T 7/90* (2017.01)
*G06T 11/00* (2006.01)

(52) U.S. Cl.
CPC .............. *G06T 15/503* (2013.01); *G06T 7/90* (2017.01); *G06T 11/001* (2013.01); *G06T 2210/62* (2013.01)

(58) Field of Classification Search
CPC ....... G06T 15/503; G06T 7/90; G06T 11/001; G06T 2210/62; G06T 11/40
See application file for complete search history.

(56) References Cited

U.S. PATENT DOCUMENTS

| 5,065,143 A | 11/1991 | Greaves et al. |
| 5,119,177 A | 6/1992 | Lim |
| 5,307,156 A | 4/1994 | Yamamoto et al. |
| 5,367,318 A | 11/1994 | Beaudin et al. |
| 5,428,385 A | 6/1995 | Sakata |
| 5,440,682 A | 8/1995 | Deering |
| 5,475,442 A | 12/1995 | Matsushita |
| 5,521,722 A | 5/1996 | Colvill et al. |
| 5,537,157 A | 7/1996 | Washino et al. |
| 5,598,525 A | 1/1997 | Nally et al. |
| 5,621,869 A | 4/1997 | Drews |
| 5,663,768 A | 9/1997 | Yang |
| 5,668,890 A | 9/1997 | Winkelman |

(Continued)

OTHER PUBLICATIONS

Foley; Computer Graphics: Principles and Practice; 1987; Addison-Wesley; Second Edition; p. 835.

(Continued)

*Primary Examiner* — Michael Le

(57) ABSTRACT

In some examples, an apparatus obtains source layer pixels, such as those of a content image and first destination layer pixels, such as those of a destination image. The first destination layer pixels have associated alpha values. The apparatus obtains information that indicates a first blending color format for the alpha values. The first blending color format is different from a first destination layer color format for the first destination layer pixels and an output color format for a display. The apparatus converts the source and/or first destination layer pixels to the first blending color format. The apparatus generates first alpha blended pixels based on alpha blending the source layer pixels with the first destination layer pixels using the associated alpha values. The apparatus provides, for display on the display, the first alpha blended pixels.

26 Claims, 7 Drawing Sheets

(56) References Cited

U.S. PATENT DOCUMENTS

| | | | |
|---|---|---|---|
| 5,790,096 A | 8/1998 | Hill, Jr. | |
| 5,801,716 A | 9/1998 | Silverbrook | |
| 5,841,439 A | 11/1998 | Pose et al. | |
| 5,861,864 A | 1/1999 | Jensen | |
| 5,874,937 A | 2/1999 | Kesatosha | |
| 5,874,967 A | 2/1999 | West et al. | |
| 5,900,860 A | 5/1999 | Ueda | |
| 5,907,364 A | 5/1999 | Furuhata et al. | |
| 5,963,201 A | 10/1999 | McGreggor et al. | |
| 5,982,443 A | 11/1999 | Chung | |
| 6,028,583 A | 2/2000 | Hamburg | |
| 6,034,667 A | 3/2000 | Barrett | |
| 6,064,393 A | 5/2000 | Lengyel et al. | |
| 6,069,664 A | 5/2000 | Zhu et al. | |
| 6,081,254 A | 6/2000 | Tanaka et al. | |
| 6,088,038 A | 7/2000 | Edge et al. | |
| 6,091,857 A | 7/2000 | Shaw et al. | |
| 6,157,415 A * | 12/2000 | Glen | H04N 9/76 348/453 |
| 6,184,891 B1 | 2/2001 | Blinn | |
| 6,288,730 B1 | 9/2001 | Duluk et al. | |
| 6,326,964 B1 | 12/2001 | Snyder et al. | |
| 6,462,786 B1 | 10/2002 | Glen et al. | |
| 6,466,220 B1 * | 10/2002 | Cesana | G06T 1/20 345/537 |
| 6,473,091 B1 | 10/2002 | Ida et al. | |
| 6,501,480 B1 | 12/2002 | MacInnis et al. | |
| 6,538,656 B1 | 3/2003 | Cheung et al. | |
| 6,717,576 B1 | 4/2004 | Duluk et al. | |
| 6,768,774 B1 | 7/2004 | MacInnis et al. | |
| 6,927,778 B2 * | 8/2005 | Aleksic | G09G 5/026 345/592 |
| 6,927,783 B1 | 8/2005 | MacInnis et al. | |
| 7,307,667 B1 * | 12/2007 | Yeh | G09G 5/001 386/E5.001 |
| 7,483,042 B1 * | 1/2009 | Glen | G09G 5/10 345/506 |
| 2004/0056864 A1 * | 3/2004 | Valmiki | G09G 5/28 348/E7.012 |
| 2005/0024369 A1 | 2/2005 | Xie | |
| 2007/0057972 A1 * | 3/2007 | Krasnopolsky | G09G 5/026 345/629 |
| 2015/0156469 A1 * | 6/2015 | Qu | G09G 5/36 348/43 |
| 2017/0186141 A1 * | 6/2017 | Ha | G06T 5/009 |
| 2019/0027082 A1 * | 1/2019 | Van Belle | G09G 5/10 |
| 2019/0149792 A1 * | 5/2019 | Luo | H04N 9/76 348/571 |

OTHER PUBLICATIONS

Pfister, Hanspeter et al.; The VolumePro real-time ray-casting system; Proceedings of the 26th annual conference on Computer graphics and interactive techniques SIGGRAPH '99; Jul. 1999.

International Search Report and Written Opinion, PCT/CA2020/050892, dated Sep. 18, 2020, 14 pages.

Wikipedia, RGB color model, URL: https://web.archive.org/web/20181212140249/https://en.wikipedia.org/wiki/RGB_color_model, last edited Nov. 25, 2018, printed Jan. 24, 2022, 13 pages.

Wikipedia, sRGB, URL: https://web.archive.org/web/20181207180616/https://en.wikipedia.org/wiki/SRGB, last edited Oct. 22, 2018, printed Jan. 24, 2022, 7 pages.

Wikipedia, YUV, URL: https://web.archive.org/web/20181219064923/https://en.wikipedia.org/wiki/YUV, last edited Dec. 15, 2018, printed Jan. 24, 2022, 10 pages.

* cited by examiner

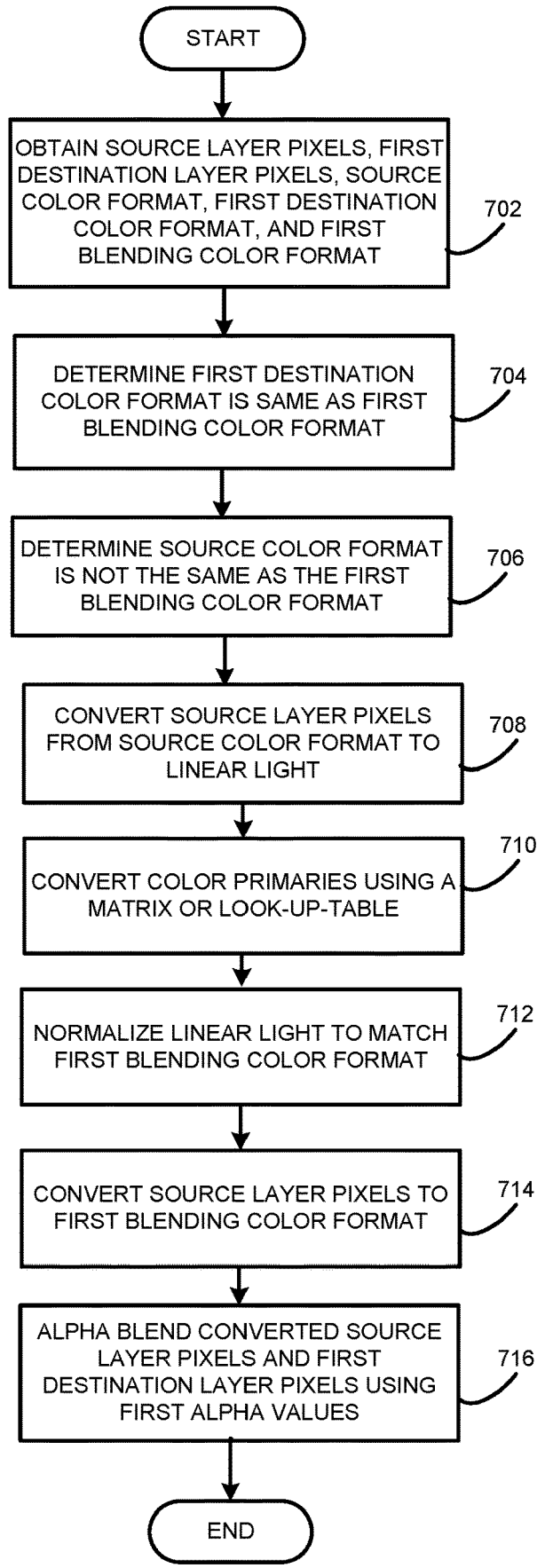
FIG. 7

METHOD AND APPARATUS FOR ALPHA BLENDING IMAGES FROM DIFFERENT COLOR FORMATS

BACKGROUND OF THE DISCLOSURE

Prior to displaying an image on a display, an image processor alpha blends two or more layers or images to generate an alpha blended image. For example, the image processor alpha blends a source image with a destination image (e.g., overlay image), using an alpha value associated with the destination image. The alpha value is typically a value between 0 and 1 and indicates the transparency level of the destination image and/or the source image as they are blended together to form a single image. However, the destination and source image can be in different color formats. For example, one image can be in a high dynamic range (HDR) color format and the other image can be in a standard dynamic range (SDR) color format. Due to the difference in non-linearity between different color formats, applying the original alpha values causes the transparency levels between the images to be different from what an author or programmer of one of the images intended.

In some instances, to accommodate for the different color formats, the source and destination images are converted into a common linear light HDR format, and the alpha blending happens in the common linear light HDR format. However, this may cause an incorrect transparency result if the alpha values were formatted for the SDR color format, and an extremely incorrect transparency for the alpha values were formatted for the HDR color format. Other methods are known to compensate by applying a correction to the alpha values. However, this may also result in the original alpha blending intent of the source to be altered. Additionally, when blending HDR and SDR images, a problem can arise in providing correct relative brightness of the images in the output or display device's color format. Known methods to correct the relative brightness include user preference adjustment sliders and/or a dynamic adjustment based on ambient light level detection in the viewing environment. However, this solves only part of the problem, and does not address how to blend images while maintaining the original alpha blending intent of the source.

Furthermore, each color format may include a gamma space (e.g., a linearity/non-linearity curve used for color coding) and specific color primaries. Apparatus, such as graphics processing units (GPUs)) are known to convert the layers (e.g., source and/or destination images) to the gamma space for the destination image and/or the gamma space for the display interface. Then, after the conversion to these gamma spaces, the GPU may alpha blend the converted layers (e.g., the source and/or destination image is converted to the gamma space for the destination image and/or for the display interface) to form an alpha blended image.

In many instances, the author or programmer may intend the alpha blending to occur in color formats different from the gamma spaces for the destination image and/or the display interface. However, currently, there is no method or apparatus available for converting the source and/or first destination layer pixels to color formats other than the destination image's color format and/or the display interface's color format prior to alpha blending. Additionally, the author or programmer may intend the alpha blending to include multiple blending stages (e.g., two pixel layers may be alpha blended together and then the result may be blended with a third pixel layer) using different color formats between the blending stages (e.g., a first color blending format and a second blending color format). Again, currently, there is no method or apparatus available to account for the different color formats between the blending stages. Accordingly, there exists a need for one or more improved methods and/or apparatus in order to address one or more of the above-noted drawbacks.

BRIEF DESCRIPTION OF THE DRAWINGS

The implementations will be more readily understood in view of the following description when accompanied by the below figures and wherein like reference numerals represent like elements, wherein:

FIG. 7 is a flowchart illustrating another method for alpha blending images from different color formats in accordance with one variation set forth in the disclosure.

DETAILED DESCRIPTION OF IMPLEMENTATIONS

Figure 1:
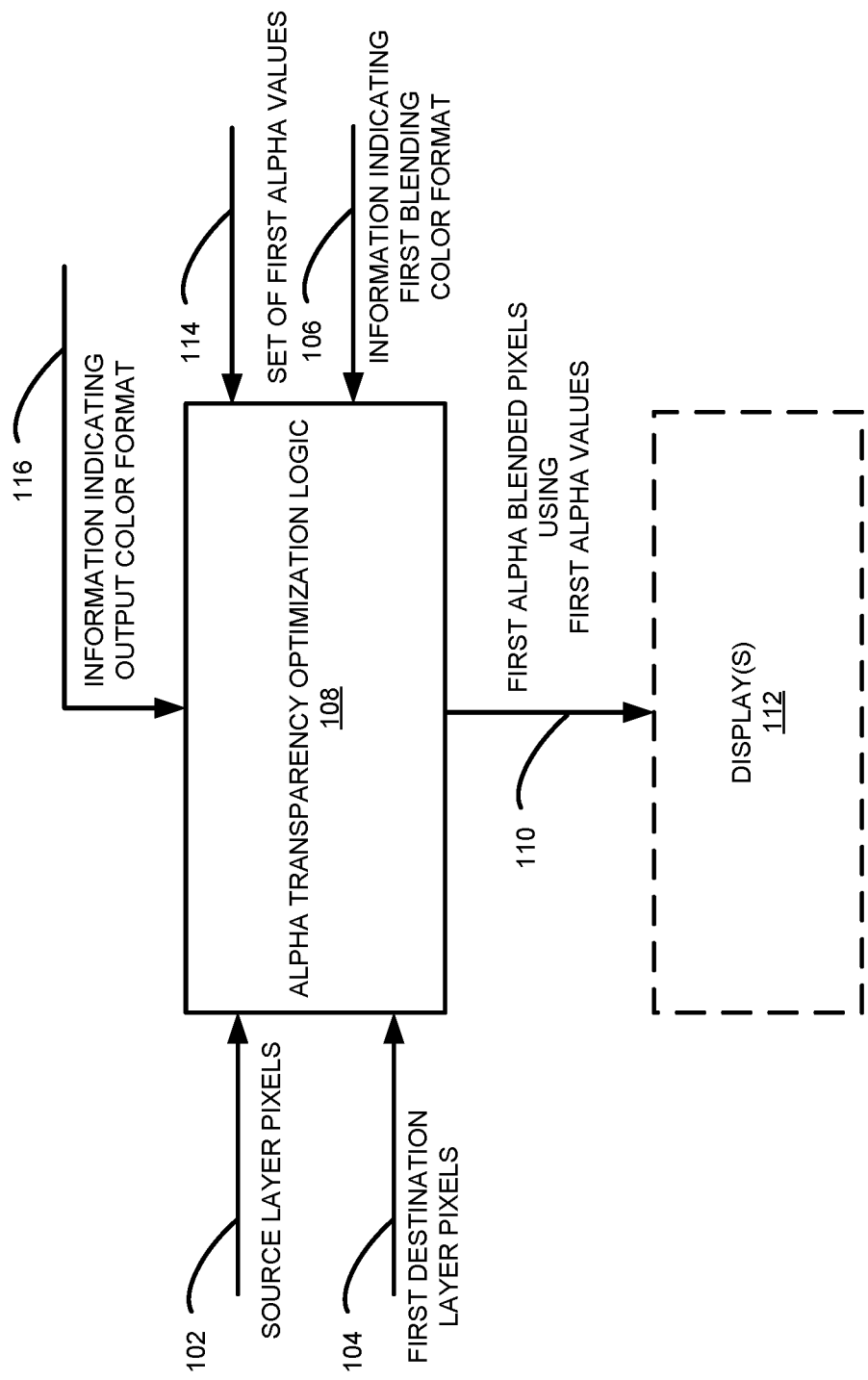
FIG. 1 is a schematic block diagram illustrating an apparatus for alpha blending images from different color formats in accordance with one variation set forth in the disclosure.

In some examples, methods and apparatus employ alpha blending transparency optimization logic to preserve or maintain the original alpha blending intent of an author, such as a programmer of a destination image (e.g., destination layer pixels) that is to be alpha blended with a content image (e.g., source image or source layer pixels). In some instances, the destination image is a user interface image, a logo image, or another type of destination image. For example, alpha values indicated by a user interface image are intended to be used to alpha blend images from a single-color format, such as the destination color format (e.g., a first destination layer color format). As such, by converting images (e.g., source/destination images) from their original color format to the blending color format (e.g., the color format used for alpha blending the images), the alpha blending transparency optimization logic either maintains the original alpha blending intent or minimizes the distortion caused by the destination image and the content image being in different color formats. This will be explained in further detail below.

In some examples, an apparatus obtains source layer pixels, such as those of a source or content image and first destination layer pixels, such as those of a destination image. The first destination layer pixels have associated first alpha values. The apparatus obtains information indicating a first blending color format for the first alpha values. The first blending color format (e.g., a standard red green blue (sRGB) color format) is different from a first destination layer color format (e.g., a perceptual quantizer (PQ) color format) that the first destination layer pixels are in and different from an output color format (e.g., a hybrid log-gamma (HLG) color format) for a display. The apparatus converts the source layer pixels and/or the first destination layer pixels to the first blending color format. The apparatus generates first alpha blended pixels based on alpha blending the source layer pixels with the first destination layer pixels using the first alpha values in response to converting the source layer pixels and/or the first destination layer pixels to the first blending color format. The apparatus provides, for display on the display, the first alpha blended pixels.

For some examples, different color format conversion techniques are employed prior to alpha blending. For instance, in some variations, the first blending color format includes a first blending gamma space and a first blending set of color primaries. The gamma space indicates data representing the linearity/non-linearity of the first blending color format. The apparatus converts the source layer pixels and/or the first destination layer pixels to the first blending gamma space using data representing a transfer function for the first blending gamma space. In some examples, the first blending gamma space is a linear gamma space and the transfer function is a gamma transfer function. The transfer function for the first blending gamma space is stored in the memory of the apparatus. In other variations, the apparatus converts the source layer pixels and/or the first destination layer pixels to the first blending set of color primaries using data representing one or more gamma transfer functions and/or one or more linear to linear transfer functions. The one or more gamma transfer functions and/or one or more linear to linear transfer functions are stored in the memory of the apparatus. In yet other variations, the apparatus converts the at least one of the source layer pixels and the first destination layer pixels to the first blending gamma space and the first blending set of color primaries.

In some examples, multiple alpha blending stages are employed. For example, in a second, third, or another subsequent alpha blending stage, the apparatus converts the previously generated alpha blended pixels and/or a new destination layer (e.g., second destination layer pixels) to the second blending color format, which is a color format different from the first blending color format. For example, the apparatus obtains second destination pixels associated with second alpha values and information indicating a second blending color format (e.g., the PQ color format). Then, the apparatus converts the first alpha blended pixels and/or the second destination layer pixels to the second blending color format. The apparatus generates second alpha blended pixels based on alpha blending the first alpha blended pixels with the second destination layer pixels using the second alpha values in response to the converting the first alpha blended pixels and/or the second destination layer pixels.

In some instances (e.g., when the apparatus performs multiple stages of alpha blending), the first blending color format is a same color format as the first destination layer color format. In some variations, similar to the first blending color format, the second blending color format includes a second blending gamma space and a second blending set of color primaries. The apparatus employs different color format conversion techniques for the second or subsequent stages of alpha blending. For example, the apparatus converts the first alpha blended pixels and/or the second destination layer pixels to the second blending gamma space using data representing a gamma transfer function associated with the second blending gamma space. In some examples, the second blending gamma space is a same gamma space as the output color format. In some instances, the apparatus converts the first alpha blended pixels and the second destination layer pixels to the second blending set of color primaries using data representing one or more gamma transfer functions and one or more linear transfer functions.

In some examples, prior to displaying the first alpha blended pixels on the display, the apparatus further converts and/or performs HDR tone mapping on the pixels. For example, the apparatus converts the first alpha blended pixels to the output color format. Then, the apparatus provides for display the first alpha blended pixels on the display. In some instances, the apparatus performs tone mapping (e.g., high dynamic range (HDR) tone mapping) for the plurality of first alpha blended pixels.

In some instances, the apparatus performs tone mapping in place of or during the color format conversion process. For example, the apparatus converts the source layer pixels and/or the first destination layer by tone mapping the source layer pixels and/or the first destination layer pixels. In some variations, the apparatus includes a graphics processing unit (GPU) that includes a display engine. The display engine includes an alpha transparency optimization logic that is configured to convert the source pixels and/or the first destination layer pixels to the first blending color format prior to alpha blending the source pixels with the first destination layer pixels. In some instances, the apparatus includes memory that has one or more frame buffers storing the source layer pixels, the first destination layer pixels, the set of alpha values, and/or the first blending color format.

FIG. 1 illustrates one example of an apparatus 100, such as an image processing device, for alpha blending images from different color formats. In some implementations, the apparatus 100 includes any type of computing device suitable for implementing aspects of variations of the disclosed subject matter. Examples of computing devices include but are not limited to workstations, laptops, desktops, tablet computers, hand-held devices, display devices, media players, set-top boxes, televisions, game consoles, printers, servers, cloud computing platforms, integrated circuits and the like, all of which are contemplated within the scope of FIG. 1, with reference to various components of the apparatus 100.

In some variations, the apparatus 100 includes alpha transparency optimization logic 108 and display(s) 112. The alpha transparency optimization logic 108 obtains source layer pixels 102 in a source color format, first destination layer pixels 104 (e.g., an overlay image) in a first destination layer color format (e.g., an overlay color format), a set of first alpha values 114 in a first blending color format, information 106 indicating the first blending color format, and/or information 116 indicating an output color format. The first destination layer pixels 104 is associated with the set of first alpha values 114. In other words, the programmer and/or author programmed or intended the first destination layer pixels 104 to be alpha blended using the set of first alpha values 114. In some instances, the same frame buffer in memory stores the first destination layer pixels 104 and set of alpha values 114. The logic 108 retrieves information including the first destination layer pixels 104 and the set of alpha values 114 from the frame buffer and then splits the information into the first destination layer pixels 104 and the set of alpha values 114.

In some examples, the apparatus 100 is a movie player (e.g., a DVD player and/or a BLU-RAY player). The apparatus 100 obtains the source pixels 102 and/or the source color format from a content source, such as a DVD or BLU-RAY disc. The apparatus 100 obtains the first destination pixels 104 and/or the first destination color format from the memory of the movie player. The first destination pixels 104 represents a graphical user interface that is to be alpha blended with the source layer pixels 102. The first destination pixels 104, the first destination color format, the first alpha values 114, and the first blending color format are stored in the memory of the movie player. The logic 108 obtains the source layer pixels 102 in a source color format, first destination layer pixels 104 (e.g., an overlay image) in a first destination layer color format (e.g., an overlay color format), a set of first alpha values 114 in a first blending color format, and information 106 indicating the first blending color format from the memory of the gaming console and/or from the content source. The output color format is a color format for a display 112 (e.g., a display device and/or a display interface). In some instances, the logic 108 obtains the information 116 for the output color format from the display 112. The first blending color format is a color format for the set of first alpha values 114 that is used for blending the source layer pixels 102 and the first destination layer pixels 104.

In some variations, the apparatus 100 optionally includes display 112. When present, the alpha transparency optimization logic 108 and the display 112 are in the same apparatus. The display 112 includes one or more monitors, television screens, projection device, and/or other display screens that display and/or show video or game frames, movies, and/or images. The logic 108 provides the first alpha blended pixels 110 to the display 112 and the display 112 displays the first alpha blended pixels 110. In some examples, apparatus 100 does not include a display. As such, the alpha transparency optimization logic 108 provides (e.g., sends or transmits) image data, such as the first alpha blended pixels 110, via the internet, wirelessly, wired buses, or through any suitable manner to one or more additional apparatus that house the display(s) 112. The illustrative apparatus 100, including the alpha transparency optimization logic 108, is not intended to suggest any limitation as to the scope of use or functionality of variations of the present disclosure.

Figure 2:
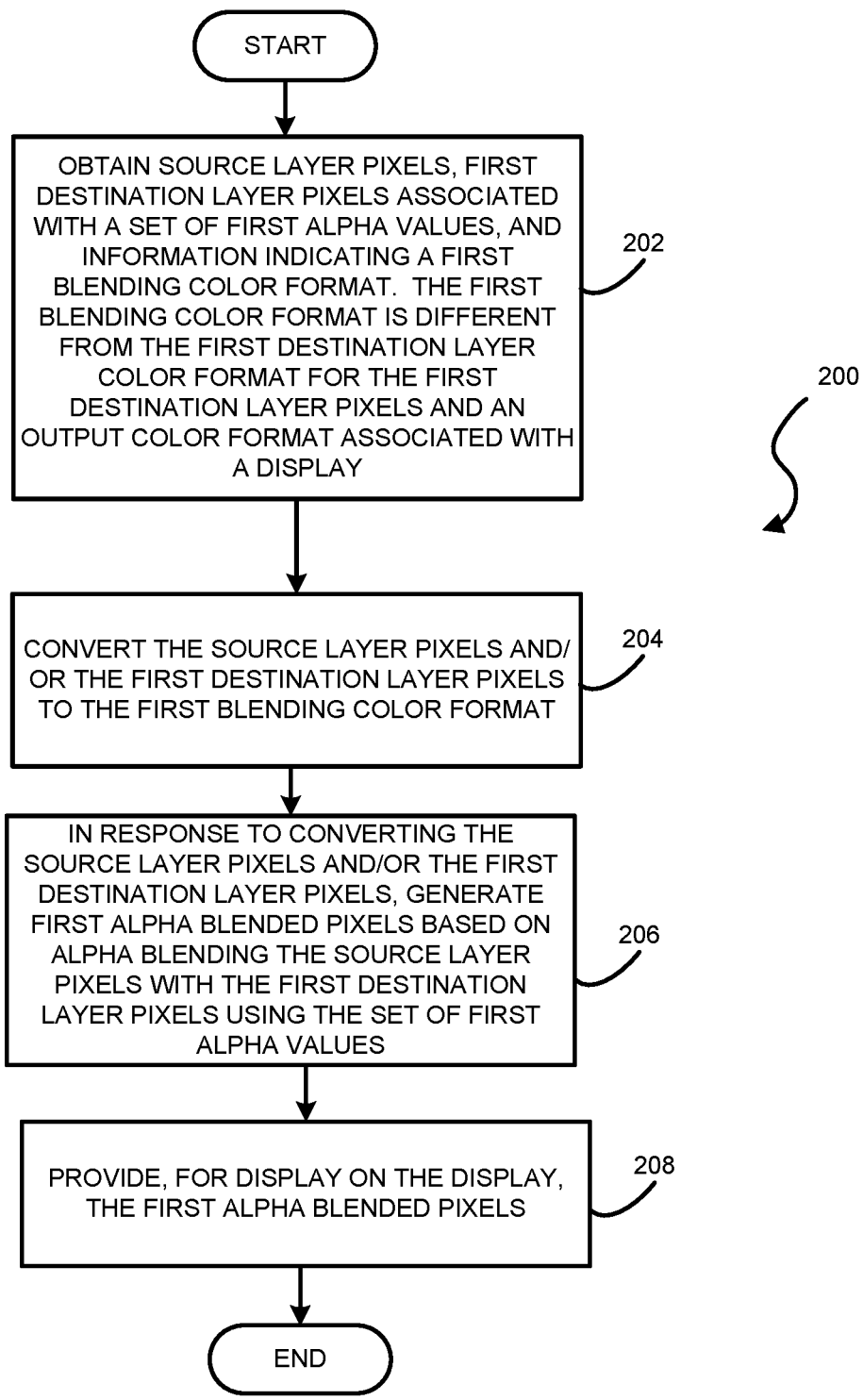
FIG. 2 is a flowchart illustrating a method for alpha blending images from different color formats in accordance with one variation set forth in the disclosure.
Figure 3:
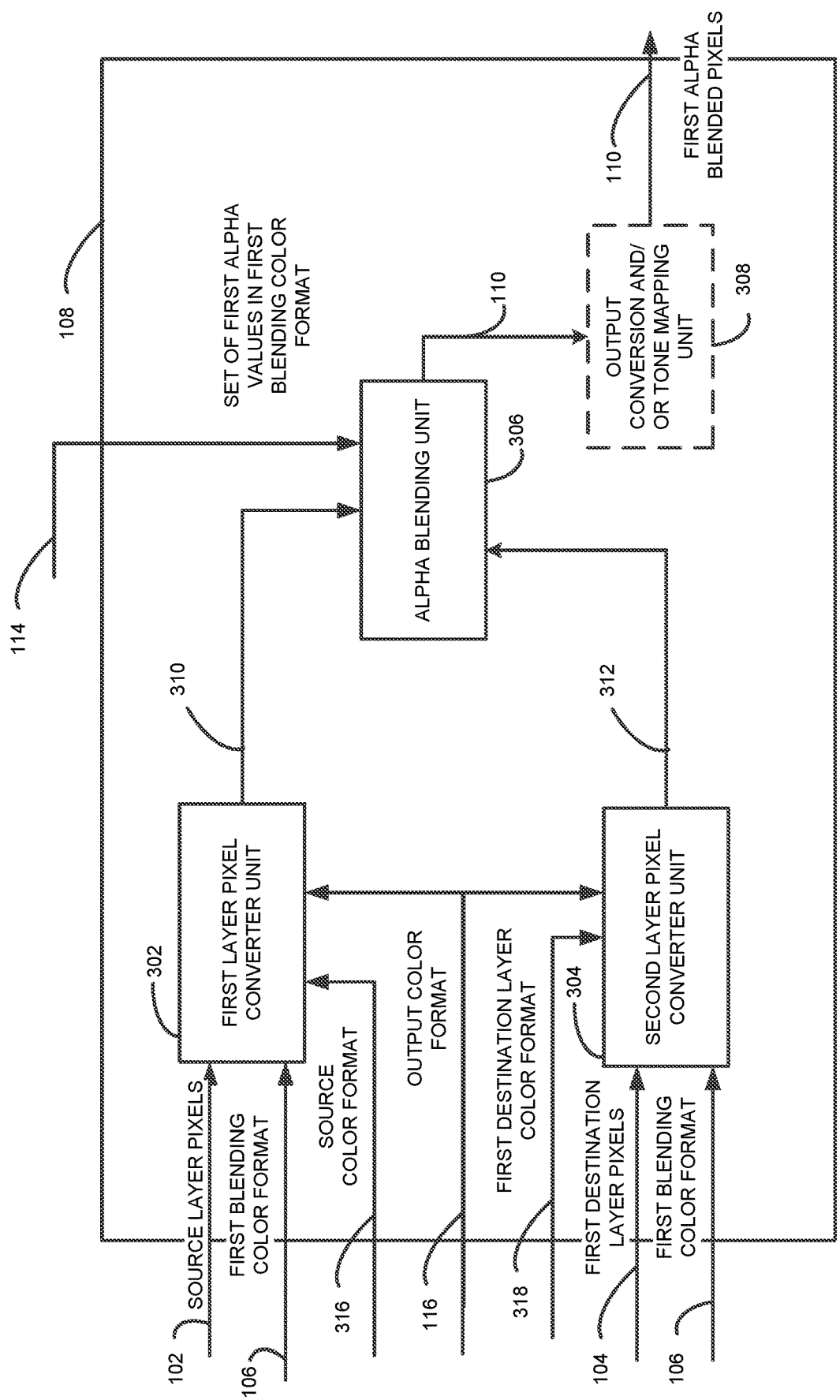
FIG. 3 is a schematic block diagram illustrating an example of an alpha transparency optimization logic for alpha blending images from different color formats in accordance with one variation set forth in the disclosure.

Referring to FIGS. 1-3, an example of a method 200 for alpha blending images from different color formats and an example of the alpha transparency optimization logic are illustrated. The method 200 will be described with reference to the apparatus 100 and the logic 108. However, any suitable structure can be employed. The alpha transparency optimization logic 108 includes a first layer pixel converter unit 302 (e.g., a source image converter unit), a second layer pixel converter unit 304 (e.g., a destination image converter unit), an alpha blending unit 306, and/or an output conversion and/or tone mapping unit 308. Although these sub-units 302, 304, 306, and/or 308 are illustrated as children units subordinate of the parent logic 108, each sub-unit can be operated as a separate unit from the logic 108, and other suitable combinations of sub-units are contemplated to suit different applications.

In some instances, the output conversion and/or tone mapping unit 308 is optional. When present, the unit 308 performs HDR tone mapping of the first alpha blended pixels 110. Additionally, and/or alternatively, the unit 308 converts the pixels 110 to the output color format for the display 112. If the unit 308 is not present in the logic 108, the logic 108 does not perform HDR tone mapping and/or convert the pixels to the output color format (e.g., another entity converts and/or tone maps the first alpha blended pixels 110).

The logic 108 is any suitable logic configuration including, but not limited to, one or more state machines, one or more digital signal processors, as part of one or more CPUs, GPUs, APUs or processors that execute kernels, and/or other suitable structure as desired. As used herein, the term "unit" refers to, be part of, or include an Application Specific Integrated Circuit (ASIC), an electronic circuit, a processor or microprocessor (shared, dedicated, or group) and/or memory (shared, dedicated, or group) that executes one or more software or firmware programs, a combinational logic circuit, and/or other suitable components that provide the described functionality.

In operation, at step 202, the logic 108 obtains source layer pixels 102 (e.g., a source image), first destination layer pixels 104 (e.g., a destination image) associated with a set of first alpha values 114, and an indicator that indicates a first blending color format 106 for the set of first alpha values 114. The first blending color format is different from a first destination layer color format (e.g., the color format of the first destination layer pixels 104) and an output color format (e.g., the color format that the display 112 outputs or display images in).

For example, the unit 302 obtains the source layer pixels 102. The unit 304 obtains the first destination layer pixels 104. In some variations, the apparatus 100 generates the source and first destination layer pixels 102, 104 that the units 302 and/or 304 later on obtain. In other variations, the apparatus 100 obtains the source and first destination layer pixels 102, 104 from another entity (e.g., a web server). In yet other variations, the apparatus 100 generates one of the source or first destination layer pixels 102, 104 and obtains the other of the source or first destination layer pixels 102, 104.

In some examples, the apparatus 100, such as a gaming console, is configured to execute instructions from a content source and/or from memory. The content source is a device, such as memory, server, video disk, game disk (e.g., legacy game disk), DVD, other video or image formats that include memory, and/or one or more processors, that provides the instructions to the apparatus 100 to generate the source or first destination layer pixels 102, 104. Further, the memory of the content source includes instructions executable by the apparatus 100 (e.g., a gaming console and/or a computing device). The apparatus 100 obtains and/or executes instructions from the memory of the content source, and based on executing the instructions, the apparatus 100 obtains and/or generates the source layer pixels 102 and/or the first destination layer pixels 104. Additionally, and/or alternatively, based on executing the instructions, the apparatus 100 determines or identifies a color format for the source layer pixels 102 and/or the first destination layer pixels 104 (e.g., a source and first destination layer color format). In other words, by executing the instructions, the apparatus 100 retrieves information from the content source indicating the color format for the source/first destination layer pixels 102, 104.

In other examples, the apparatus 100 obtains the source layer pixels 102 and/or first destination layer pixels 104 from a content source, such as a web server for a streaming provider. In such instances, the content source is an entity, such as a web server. The web server (e.g., a video service, game service, and/or streaming service web server) provides information indicating the game, movie, television show, and/or other video or image files to the apparatus 100. Additionally, and/or alternatively, the apparatus 100 obtains information indicating the color format for the source and/or first destination layer pixels 102, 104 from the content source.

After generating and/or obtaining the pixels 102, 104, the apparatus 100 stores the pixels 102 in a first frame buffer and the pixels 104 in a second frame buffer. In other words, a graphics engine or 3-D engine generates the pixels 102 and/or 104 and stores these pixels 102, 104 in frame buffers. In some examples, the frame buffer is in apparatus 100 memory. In other examples, the frame buffer is in chip or processor memory, such as in graphics processing unit (GPU) and/or central processing unit (CPU) data caches. The unit 302 obtains the source layer pixels 102 from a frame buffer storing the source layer pixels 102. Further, the unit 304 obtains the first destination layer pixels 104 from a different frame buffer storing the first destination layer pixels 104.

In some examples, the source or first destination layer pixels 102, 104 are from two different images that were previously alpha blended together. For example, apparatus 100 generates the source layer pixels 102 by alpha blending a first set of pixels and a second set of pixels using a set of alpha values. The apparatus 100 stores the source layer pixels 102 in a frame buffer and/or feeds it back into the logic 108. The unit 302 obtains the source layer pixels 102 as described above.

In addition to obtaining the source layer pixels 102, the unit 302 also obtains a source color format 316 for the source layer pixels and information 106 indicating the first blending color format. Further, in addition to obtaining the first destination layer pixels 104, the unit 304 also obtains a first destination layer color format for the first destination layer pixels 318 and the information indicating the first blending color format. For example, the source and/or first destination layer pixels 102, 104 each make up an image. Each pixel of the image has a corresponding light value. A light value of a pixel is a set of physical values which can be measured using a light meter. Using the luminance level normalization and a transfer function, the light value of a pixel can be mapped into different color formats. Color formats are also referred to as color spaces (e.g., standard red green blue (sRGB) color spaces).

Each color format (e.g., color space) uses different values to represent the light value. Further, each color format includes a combination of a gamma space and specific color primaries. The gamma space is data indicating the linearity and/or non-linearity curve used for color coding into the color format. These gamma spaces are also frequently referred to as transfer functions (e.g., an electrical-optical transfer function (EOTF) and/or an optical-electrical transfer function (OETF)), which can be gamma transfer functions or linear to linear transfer functions. Gamma transfer functions (e.g., transfer functions with a gamma value and other more complex transfer functions) include linear to non-linear transfer functions, non-linear to linear transfer functions, and non-linear to non-linear transfer functions. As will be explained in more detail below, the logic 108 uses data representing these transfer functions, including gamma transfer functions and linear-to-linear transfer functions, to convert between different color formats. The data representing these transfer functions include the actual transfer functions and/or matrices representing the transfer functions. In some instances, the color format is linear, and the transfer function uses a gamma of 1.0. In some examples, the color primaries are a particular mapping or mathematical definition of the colors (e.g., red, green, blue, white, and so on) for a color standard, such as the International Commission of Illumination (CIE) color standards.

Examples of different color formats include, but are not limited to, a standard red green blue (sRGB) color format, an extended sRGB (EsRGB) color format (e.g., an sRGB color format that is extended to 10,000 nits), a BT.709 color format, perceptual quantizer (PQ) color format (e.g., the PQ color format defined in Society of Motion Picture and Television Engineers (SMPTE) ST2084 and/or International Telecommunication Union (ITU) BT2100), a hybrid log-gamma (HLG) color format, a modified HLG color format, a PQ HLG color format, an EsRGB HLG color format, a standard dynamic range (SDR) color format, and/or a high dynamic range (HDR) color format.

The first blending color format relates to the set of first alpha values 114 that are used to alpha blend the source layer pixels 102 with the first destination layer pixels 104. For example, the source layer pixels 102 is a source image (e.g., an image from the content source). The first destination layer pixels 104 is a destination image (e.g., an image, such as a graphical user interface image, that is to be alpha blended with the source image). The author or programmer intended (e.g., programmed or designed) the first destination layer pixels 104 to be alpha blended in the first blending color format and using the set of first alpha values 114. The apparatus 100 obtains and/or determines the first blending color format for the set of first alpha values 114. Then, the apparatus 100 provides the first blending color format to the unit 302 and/or the unit 304. In some examples, the graphical user interface image is an image that includes inputs selectable by a user and is eventually alpha blended with a content image (e.g., source image).

In some instances, the apparatus 100 obtains and/or determines the first blending color format based on generating and/or obtaining the first destination layer pixels 104. In other words, when executing the instructions to generate the first destination layer pixels 104 and/or when obtaining these pixels 104, the apparatus 100 also obtains and/or determines the first blending color format. In some variations, the apparatus 100 stores the first blending color format in a frame buffer, such as the frame buffer storing the first destination layer pixels 104/the graphical user interface. The source and first destination layer pixel converter units 302, 304 obtain the first blending color format 106 from the frame buffer.

The unit 302 and the unit 304 obtains information 116 indicating the output color format. As mentioned above, the output color format is associated with the display 112 (e.g., the display 112 displays or outputs images/pixels in the output color format). In some examples, the display 112 provides the information 116 (e.g., extended display identification data (EDID) information) that indicates the output color format to the logic 108. In other examples, the apparatus 100 obtains the information 116 via an internet connection (e.g., from a web server).

At step 204, the logic 108 converts the source layer pixels 102 and/or the first destination layer pixels 104 to the first blending color format. For example, after obtaining the source layer pixels 102, the first blending color format, the output color format, and the source color format, the unit 302 determines whether to convert the source layer pixels 102 to the first blending color format. For example, the unit 302 compares the source color format and the first blending color format. If the source color format is different from the first blending color format, the unit 302 converts the source layer pixels 102 from the source color format to the first blending color format.

Similarly, after obtaining the first destination layer pixels 104, the first blending color format, the output color format, and the first destination layer color format, the unit 304 determines whether to convert the first destination layer pixels 102 to the first blending color format. For example, the unit 304 compares the first destination layer color format and the first blending color format. If the first destination layer color format is different from the first blending color format, the unit 304 converts the first destination layer pixels 102 from the first destination layer color format to the first blending color format.

In other words, prior to alpha blending the source and first destination layer pixels 102, 104, the logic 108 determines whether the pixels 102, 104 are in the first blending color format and if not, converts the pixels 102, 104 from their corresponding color formats to the first blending color format. For example, the author or programmer of the destination image (e.g., the first destination layer pixels 104) intends a certain transparency level for the first destination layer pixels 104 when it is alpha blended. Traditionally, if the source and/or first destination layer pixels 102, 104 are in different color formats, alpha blending these pixel layers 102, 104 using the first alpha values 114 causes the intent of the author to be distorted. As such, to preserve and/or maintain the original intent of transparency levels during alpha blending, the alpha transparency optimization logic 108 converts the source layer pixels 102 and/or the first destination layer pixels 104 from their corresponding color formats to the first blending color format prior to alpha blending the pixels 102, 104.

In some examples, the source layer pixels 102 and/or the first destination layer pixels 104 are in the same color format as the first blending color format. For example, if the first destination layer color format is the same as the first blending color format, the unit 304 does not convert the pixels 104 into the first blending color format.

As mentioned previously, each color format has a gamma space and specific color primaries. In some instances, the unit 302 compares the gamma space for the first blending color format (e.g., the first blending gamma space) with the gamma space for the source color format (e.g., the source gamma space). If different, the unit 302 converts the source layer pixels 102 from the source gamma space to the first blending gamma space using one or more transfer functions (e.g., EOTFs and/or OETFs for the source color format and/or the first blending color format). The unit 304 similarly compares and/or converts the first destination layer pixels 104 from the first destination gamma space to the first blending gamma space. In some variations, the first blending gamma space is a linear gamma space with a linear transfer function. In other variations, the gamma space is a non-linear gamma space with a non-linear transfer function.

In other instances, the color primaries between the first blending color format and the source color format/first destination color format is different. For example, the unit 302 compares the color primaries for the first blending color format with the color primaries for the source color format. If different, the unit 302 converts the source layer pixels 102 from the source color primaries to the first blending set of color primaries using one or more matrices and/or one or more transfer functions (e.g., EOTFs and/or OETFs). For example, the unit 302 uses an EOTF to linearize the source layer pixels 102. Then, the unit 302 uses one or more matrices to convert the source layer pixels 102 from the source color primaries to the first blending set of color primaries. Similarly, the unit 304 compares and/or converts the first destination layer pixels 104 from the first destination color primaries to the first blending set of color primaries.

In yet other instances, both the gamma space and the color primaries are different between the input color format and the first blending color format. The unit 302 and/or 304 converts the source layer pixels 102 and/or the first destination layer pixels 104 from the source and/or first destination gamma spaces/color primaries to the first blending color format's gamma space and color primaries.

In some variations, the first destination layer color format (for the first destination layer pixels 104) is in an SDR color format. The first blending color format is in a linear HDR color format. As such, the unit 304 converts the first destination layer pixels 104 from the first destination layer color format to the linear HDR color format. The source layer pixels 102 are converted as needed to the linear HDR color format (e.g., the unit 302 converts the source layer pixels 102 if the source layer pixels 102 are not in the linear HD color format already). The unit 306 alpha blends the source pixels 102 with the converted first destination layer pixels 104 with the source layer pixels 102 to generate the first alpha blended pixels 110 that are in the linear HD color format. Then, unit 308 converts the first alpha blended pixels 110 to the output color format such as a non-linear HDR color format (e.g., a PQ HDR color format). The logic 108 then provides the first alpha blended pixels 110 in the non-linear HDR color format to the display 112. The display 112 then displays the first alpha blended pixels 110.

In some examples, the memory, such as apparatus 100 memory and/or cache memory, stores the transfer functions and/or matrices. The units 302 and/or 304 obtains the data representing transfer functions and/or matrices from the memory and then uses this data to convert between color formats.

Additionally, and/or alternatively, in some variations, during the conversion process, the units 302 and 304 normalize the values of the source layer pixels 102 and/or the first destination layer pixels 104. For example, prior to alpha blending the pixels 102 and 104, the units 302 and 304 normalize the pixels 102 and/or 104 such that the luminance ranges of the pixels 102 and/or 104 are standardized with the luminance ranges for the first blending color format. For instance, the unit 302 determines a normalization ratio based on the source color format and the first blending color format. In other words, the unit 302 determines a brightness for a particular luminance value (e.g., 100 nits) for the source color format. The unit 302 then determines a brightness for the particular luminance value (e.g., 100 nits) for the first blending color format. The unit 302 determines the normalization ratio based on the brightness associated with the particular luminance value for the source and first blending color formats. Similarly, the unit 304 determines a normalization ratio based on the first blending color format and the first destination color format. The units 302 and/or 304 apply the normalization ratio during the conversion process for converting between their corresponding color formats (e.g., source and/or first destination color formats) to the first blending color format.

At step 206, in response to converting the source or first destination layer pixels 102, 104 to the first blending color format, the logic 108 generates first alpha blended pixels 110 based on alpha blending the source pixels 102 with the first destination layer pixels 104 using the set of first alpha values 114. For example, the alpha blending unit 306 obtains information 310 and 312 from the converter units 302 and/or

304. The information 310 includes the source layer pixels 102 or the converted source layer pixels 102. Similarly, the information 312 includes the first destination layer pixels 104 or the converted first destination layer pixels 104. The alpha blending unit 306 further obtains the first alpha values 114 that are in the first blending color format 106. In some instances, the first alpha values 114 are global alpha values (e.g., for the entire image). In other instances, the first alpha values 114 are per-pixel alpha values. For example, the alpha blending unit 306 obtains the first alpha values 114 from a frame buffer, such as the frame buffer storing the first destination layer pixels 104. In some instances, the apparatus 100 obtains and/or determines the first alpha values 114 based on generating and/or obtaining the first destination layer pixels 104 and/or determining the first blending color format. Based on generating and/or obtaining the first destination layer pixels 104, the apparatus 100 determines and/or obtains the first alpha values 114 and stores the first alpha values 114 in the frame buffer, such as the frame buffer for the first destination layer pixels 104.

The alpha blending unit 306 performs alpha blending of the source layer pixels 102 (e.g., the converted/non-converted source layer pixels) with the first destination layer pixels 104 (e.g., the converted/non-converted first destination layer pixels) using the first alpha values 114 to generate first alpha blended pixels 110. In other words, due to the converting units 302 and/or 304, the source layer pixels 102, the first destination layer pixels 104, and the first alpha values 114 are in the first blending color format. By performing the alpha blending in the first blending color format, the logic 108 (e.g., the alpha blending unit 306) preserves and/or maintains the original intent of the author or programmer of the destination pixels (e.g., the user or graphical user interface image) when setting the first alpha values 114.

The unit 308 obtains information indicating the first alpha blended pixels 110 and performs HDR tone mapping of the first alpha blended pixels 110. The unit 308 then provides the first alpha blended pixels 110 to the display 112. Additionally, and/or alternatively, the unit 308 converts the first alpha blended pixels 110 to the output color format for the display 112. For example, the unit 308 uses one or more transfer functions and/or matrices to convert from the first blending color format to the output color format. The unit 308 then provides the first alpha blended pixels 110 to the display 112.

In some examples, the unit 308 is not within the logic 108. For example, in some instances, the first alpha blended pixels 110 do not need to be HDR tone mapped (e.g., if the display 112 is an SDR display or if the pixels 110 are already in an HDR color format). In other instances, the first alpha blended pixels 110 are tone mapped and/or converted to the output color format by another entity (e.g., a display engine).

In other examples, the units 302 and/or 304 performs tone mapping (e.g., HDR tone mapping) of the source layer pixels 102 and/or the first destination layer pixels 104. For example, prior to alpha blending the pixels 102 and/or 104, the units 302 and/or 304 performs HDR tone mapping of the source layer pixels 102 and/or the first destination layer pixels 104. In some instances, during the conversion process between the source and/or first destination color format to the first blending color format, the units 302 and/or 304 performs HDR tone mapping of the source layer pixels 102 and/or the first destination layer pixels 104. In other instances, the units 302 and/or 304 does not perform a conversion between the source and/or first destination color formats to the first blending color format (e.g., the source and/or first destination color formats are in the first blending color format), and the units 302 and/or 304 only performs the HDR tone mapping of the source layer pixels 102 and/or the first destination layer pixels 104.

At step 208, the logic 108 provides, for display on a display 112, the first alpha blended pixels 110. For example, after alpha blending the source pixels 102 with the first destination layer pixels 104, converting the first alpha blended pixels 110 to the output color format, and/or HDR tone mapping the pixels, the apparatus 100 provides the first alpha blended pixels 110 for display on the display 112. The display 112 outputs for the display the first alpha blended pixels 110.

Figure 4:
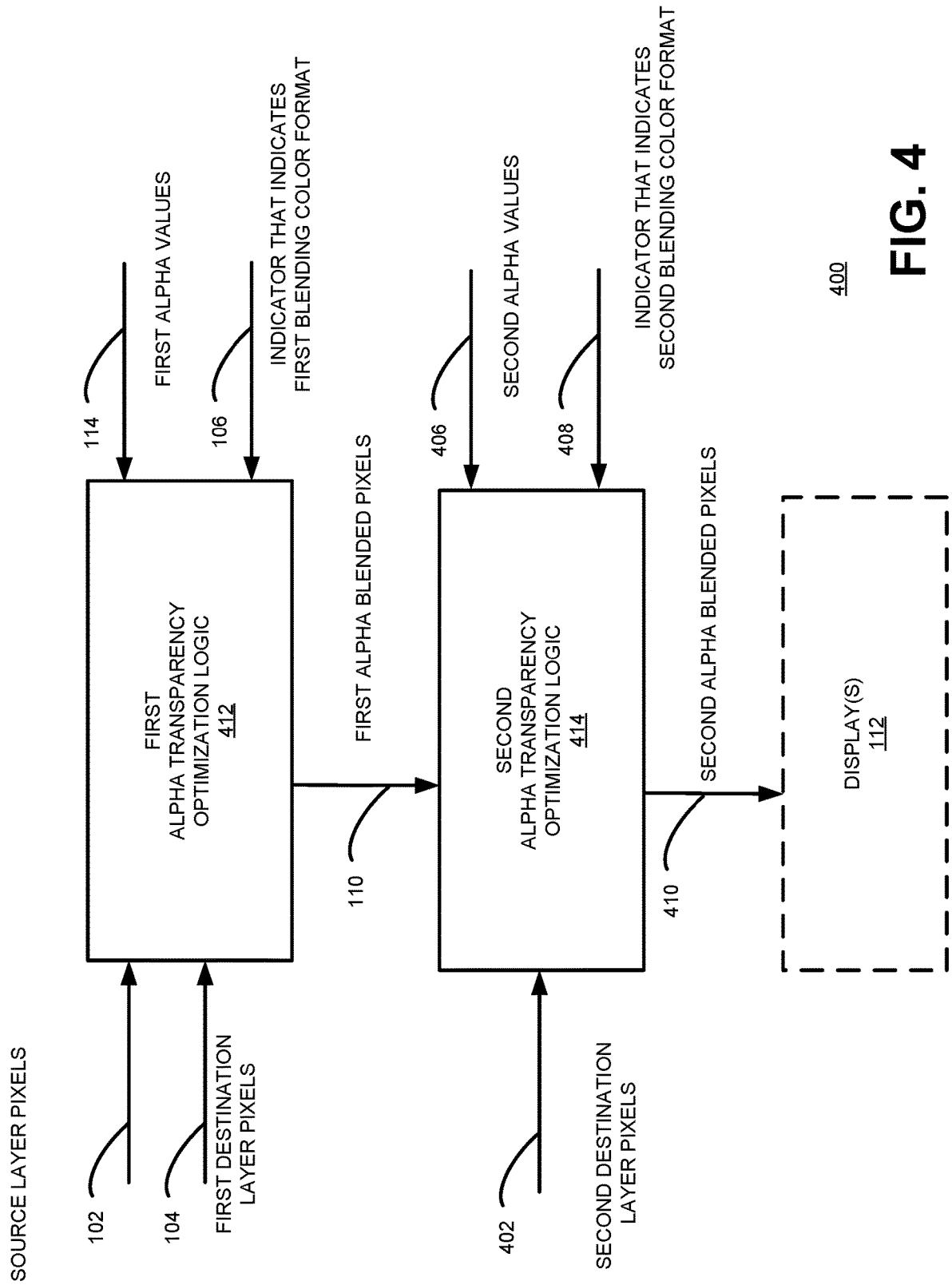
FIG. 4 is a schematic block diagram illustrating another apparatus for alpha blending images from different color formats in accordance with one variation set forth in the disclosure.

In some variations, multiple stages of alpha blending occur prior to displaying the final image on the display 112. In other words, after a first alpha blending process (e.g., generating the first alpha blended pixels 110 described in method 200 above), the logic 108 performs one or more additional alpha blending processes (e.g., repeats method 200 one or more additional times). FIG. 4 shows an apparatus 400 that includes two alpha transparency optimization logic blocks 412 and 414. Each of the logic blocks 412 and 414 includes the unit 302, the unit 304, and the alpha blending unit 306. The units 302, 304, and 306 are described above in FIG. 3. Furthermore, the first logic 412 is configured to function similarly to the logic 108 described in FIG. 3 and converts the source and/or first destination layer pixels 102/104 to a first blending color format. Then, the first logic 412 alpha blends the source and/or first destination layer pixels 102 and 104 using a set of first alpha values 114 for the first destination layer pixels 104. The first logic 412 provides the first alpha blended pixels 110 to the second logic 414.

The second logic 414 performs another alpha blending step. For example, the second logic 414 obtains second destination layer pixels 402 (e.g., another destination image), another set of alpha values 406 (e.g., second alpha values), and an indicator 408 that indicates another blending color format (e.g., a second blending color format). The second alpha values and the second blending color format are associated with the second destination layer pixels 402. In other words, the author or programmer intended the second destination layer pixels 402 to be alpha blended in the second blending color format using the second alpha values. The second blending color format is different from the first blending color format. In other words, the gamma space and/or the color primaries for the second blending color format is different from the gamma space and/or the color primaries for the first blending color format.

The second logic 414 converts the first alpha blended pixels 110 and/or the second destination layer pixels 402 to the second blending color format. For example, the second logic 414 determines whether the pixels 110 and/or 402 are in the second blending color format (e.g., whether the gamma spaces and/or the color primaries for the color formats are different). If they are different, the second logic 414 uses data representing one or more transfer functions and/or one or more matrices to convert these pixels to the second blending color format. In response to converting the pixels 110 and/or 402, the second logic 414 uses the second alpha values 406 to alpha blend the pixels 110 and/or 402 to generate second alpha blended pixels.

In some examples, the second logic 414 includes the unit 308. As mentioned above, the unit 308 converts the second alpha blended pixels 410 to the output color format and/or HDR tone maps the second alpha blended pixels 410. The second logic 414 then provides these pixels 410 to the display 112 for display. In other examples, the apparatus 400 also includes additional alpha transparency optimization logic (e.g., a third logic, a fourth logic, and so on). Each additional logic is used to perform another stage of the alpha blending process.

While the apparatus 400 shows distinct logic 412 and 414, in some variations, a single logic, such as logic 108, performs multiple, different alpha blending stages. For example, referring to FIG. 3, after generating the first alpha blended pixels 110, the logic 108 performs another alpha blending stage. For instance, the logic 108 provides the pixels 110 back to the unit 302. The unit 304 obtains another layer of pixels (e.g., the second destination layer pixels 402 shown in FIG. 4). Then, the process repeats similar to above until the desired alpha blending image has been generated. The logic 108 then provides the resulting pixels to the unit 308 and/or the display 112.

Referring to the examples above with multiple alpha blending stages, while the first blending color format (color format used for blending the source layer pixels 102 with the first destination layer pixels 104) is different from the second blending color format (color format used for blending the alpha blended source and first destination layer pixels 102 and 104 with the second destination layer pixels 402), in some variations, the first or second blending color format is a same color format as the output color format for the display 112. Additionally, and/or alternatively, the first or second blending color format is a same color format as one or more of the input color formats (e.g., the source color format for the source layer pixels 102, the first destination layer color format for the first destination layer pixels 104, and/or the second destination layer color format for the second destination layer pixels 402).

The illustrative apparatus 100 and/or 400, including the alpha transparency optimization logic 108, shown in FIGS. 1, 3, and 4 are not intended to suggest any limitation as to the scope of use or functionality of variations of the present disclosure. Neither should the illustrative apparatus 100, 400, or the logic 108 be interpreted as having any dependency or requirement related to any single component or combination of components illustrated therein. Additionally, various components depicted in FIGS. 1, 3, and 4 are, in variations, integrated with various ones of the other components depicted therein (and/or components not illustrated), all of which are considered to be within the ambit of the present disclosure.

Figure 5:
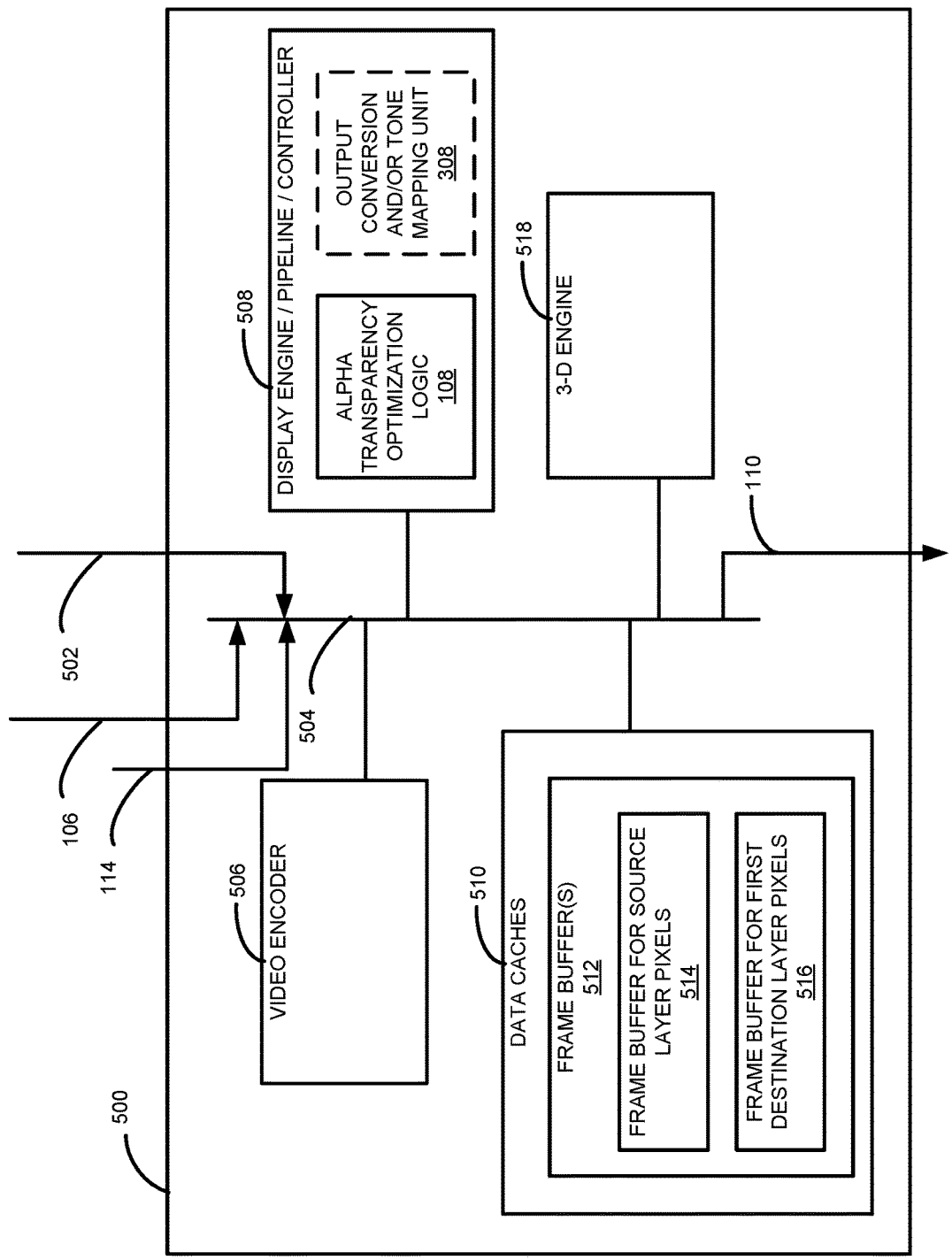
FIG. 5 is a schematic block diagram illustrating a graphics processing unit for alpha blending images from different color formats in accordance with one variation set forth in the disclosure.

FIG. 5 is a schematic block diagram illustrating an example of a GPU 500 for alpha blending images from different color formats. Variations of the present disclosure, including FIG. 5, are described below by way of example only, with reference to the accompanying drawings. Further, the following description is merely exemplary in nature and is in no way intended to limit the disclosure, its application, or uses. Thus, while this disclosure includes particular examples and arrangements of the units, the scope of the present system should not be so limited since other modifications will become apparent to the skilled practitioner.

The graphics processing unit 500 includes a bus 504 that, directly and/or indirectly, couples the following hardware components: video encoder 506, display engine, pipeline, and/or controller 508, memory 510 (e.g., data caches), and/or 3-D engine 518. Any number of additional components, different components, and/or combinations of components is also included in the graphics processing unit 500. The bus 504 represents one or more busses (such as, for example, an address bus, data bus, or combination thereof).

In some implementations, the display engine, pipeline, and/or controller (e.g., display engine) 508 includes the alpha transparency optimization logic 108 and/or the unit 308. The display engine 508 is an engine, pipeline, and/or controller that converts a frame or image, such as a source image and/or a destination image, into a displayable frame for a display, such as display 112. For example, the display engine 508 obtains source and first destination layer pixels 102, 104 from the video encoder 506 and/or the 3-D engine 518. Further, the display engine 508 obtains the first alpha values 114 and/or the first blending color format. The display engine 508 uses the alpha transparency optimization logic 108 to normalize, convert, and/or alpha blend the pixels 102, 104 as described above. Further, the display engine 508 optionally includes the unit 308. The unit 308 performs HDR tone mapping operations for the first alpha blended pixels 110 and/or converts the pixels 110 into the output color format. The display engine 508 provides the first alpha blended pixels 110 to the display 112.

In some variations, the video encoder 506 encodes and/or decodes images and/or frames of a video file and/or image file, such as a video stream. For example, as mentioned previously, in some instances, content sources are web servers. The video streams are encoded to be able to be transmitted via the Internet (e.g., due to the large file size). The video encoder 506 obtains information 502 indicating the frames, such as source images and/or destination images, from a server via the Internet and/or from the CPU. The video encoder 506 decodes the frames to generate source and first destination layer pixels 102, 104. After decoding the frames, the video encoder 506 stores the decoded frames to the frame buffers 512. Additionally, and/or alternatively, the video encoder 506 provides the decoded frames to the display engine, pipeline, and/or controller 508.

In some instances, the content source is a device with memory. The memory stores an encoded movie, TV show, video, and/or other encoded frames. The video encoder 506 decodes the encoded frames to generate the source and first destination layer pixels 102, 104. In some variations, the 3-D engine 518 is used to generate the source and first destination layer pixels 102, 104. For example, the apparatus 100 includes a CPU and the CPU executes instructions stored on the content source. Based on the instructions, the CPU provides information 502 to the 3-D engine 518 to generate pixels 102, 104. Then, the 3-D engine 518 stores the pixels 102 and 104 in the frame buffers 512. Additionally, and/or alternatively, the 3-D engine 518 provides the pixels 102, 104 to the display engine, pipeline, and/or controller 508.

In some examples, the data caches 510 includes one or more frame buffers 512. For example, the data caches 510 (e.g., the GPU data caches or processor memory) include a frame buffer 514 for the source layer pixels. Additionally, and/or alternatively, the data caches 510 include a frame buffer for the first destination layer pixels 516. As mentioned previously, in some examples, the first blending color format 106 and/or the first alpha values 114 are stored in the frame buffer 516 for the first destination layer pixels.

Figure 6:
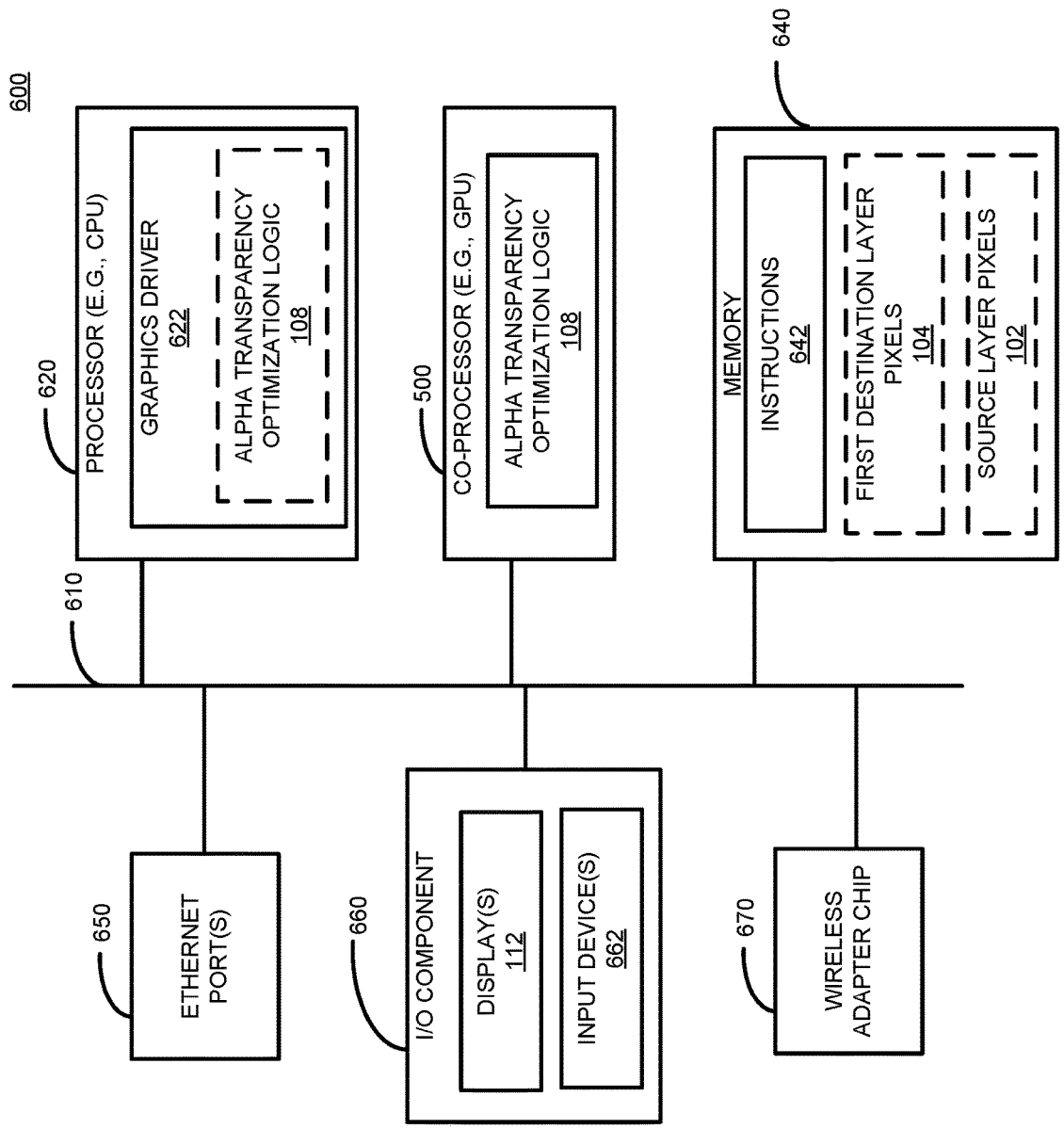
FIG. 6 is a schematic block diagram illustrating another apparatus for alpha blending images from different color formats in accordance with one variation set forth in the disclosure.

FIG. 6 is a schematic block diagram illustrating another example of an apparatus 600 for alpha blending images from different color formats. As described above, the method 200 is implemented by the apparatus 100 and/or 400 described in FIGS. 1 and 4. The apparatus 600, such as an image processing device, illustrates another example apparatus for implementing method 200.

Apparatus 600 includes a bus 610 that, directly and/or indirectly, couples the following devices: a processor 620 (e.g., CPU), a co-processor 500 (e.g., GPU), a memory 640, one or more Ethernet port(s) 650, I/O component(s) 660, and wireless adapter chip(s) 670. Any number of additional components, different components, and/or combinations of components is also included in the apparatus 600. In some implementations, the I/O component(s) 660 include a presentation component configured to present information to a user such as, for example, a touch screen, display 112, a speaker, a printing device, and/or the like, and/or an input component or device 662 such as, for example, a microphone, a joystick, a satellite dish, a scanner, a printer, a wireless device, a keyboard, a pen, a voice input device, a touch input device, a touch-screen device, an interactive display, a mouse, and/or the like.

The bus 610 represents one or more busses (such as, for example, an address bus, data bus, or combination thereof). Similarly, in some implementations, the apparatus 600 includes a number of processors 620 and co-processors 500, a number of memory components 640, a number of Ethernet port(s) 650, a number of I/O components 660, and/or a number of wireless adapter chip(s) 670. Additionally, any number of these components, or combinations thereof, is distributed and/or duplicated across a number of computing devices.

In some examples, the processor 620 (e.g., CPU) executes a graphics driver 622 (stored in memory) to cause the processor to direct, operate, and/or control the alpha transparency optimization logic 108. In some variations, the co-processor 500 (e.g., GPU) includes the alpha transparency optimization logic 108 implemented as executing shader code or as discrete logic if desired.

In some instances, the memory 640 includes one or more frame buffers. The one or more frame buffers stores the source and/or first destination layer pixels 102, 104. In some examples, the memory 640 includes computer-executable instructions 642 that when executed cause the processor 620 and co-processor 500 to implement aspects of variations of apparatus components discussed herein and/or to perform aspects of variations of methods and procedures discussed herein. The memory 640 is RAM, ROM, or any suitable memory.

The illustrative apparatus 600 shown in FIG. 6 is not intended to suggest any limitation as to the scope of use or functionality of various of the present disclosure. Neither should the illustrative apparatus 600 be interpreted as having any dependency or requirement related to any single component or combination of components illustrated therein.

FIG. 7 illustrates an example of a method 700 for alpha blending images from different color formats. In particular, FIG. 7 illustrates an example of normalizing, converting between different color formats, and alpha blending the resulting pixels using the apparatus 100 shown in FIG. 1 and/or the logic 108 shown in FIG. 3.

In operation, at step 702, the logic 108 (e.g., the converter units 302 and/or 304) obtains the source layer pixels 102, the first destination layer pixels 104, the source color format, the first destination layer color format, and/or the first blending color format 106. In the example described in FIG. 7, the source color format is a PQ color format, the first destination layer color format is an sRGB color format, and the first blending color format 106 is the sRGB color format. However, the described color formats are merely one example and the logic 108 can be used for converting between any number of different color formats, including between different linear and/or non-linear color formats.

At step 704, based on comparing the first blending color format with the first destination layer color format (e.g., comparing sRGB color format to the sRGB color format), the unit 304 determines that these color formats are the same. As such, the unit 304 does not convert the first destination layer pixels to a different color format. At step 706, based on comparing the first blending color format with the source color format (e.g., comparing sRGB color format to the PQ color format), the unit 302 determines that the source and first blending color formats 106 and 316 are not the same. As such, the steps 708-714 below describe normalizing and/or converting the source layer pixels 102 from the source color format (e.g., PQ color format) to the first blending color format (e.g., the sRGB color format).

At step 708, the converter unit 302 converts the source layer pixels 102 from the source color format (e.g., a non-linear PQ color format) to a linear light color format. The converter unit 302 uses a transfer function, such as a PQ transfer function (e.g., an 'st2084' transfer function) to convert between non-linear color formats (e.g., source color format 316) to a linear light color format. At step 710, the unit 302 converts the color primaries for the source layer pixels 102 using a matrix or look-up-table (LUT), such as a 3-D LUT.

At step 712, the converter unit 302 normalizes the source layer pixels 102 in the linear light color format to match the first blending color format (e.g., the sRGB color format). For example, the luminance range for the PQ color format (e.g., 0-10,000 nits) is different from the luminance range for the sRGB color format (e.g., 0-250 nits). As such, the converter unit 302 normalizes the source layer pixels 102 based on the luminance ranges for the PQ color format and the sRGB color format. In other words, the converter unit 302 determines the normalization ratio (e.g., 10,000/250) using the peak white values in both ranges. Then, the unit 302 multiplies the source layer pixels 102 by the normalization ratio (e.g., multiplies the source layer pixels 102 by the peak white value for the PQ color format, 10,000 nits, and divide by the peak white value for the sRGB color format, 250 nits.

At step 714, the unit 302 converts the normalized source layer pixels 102 in the linear light color format to the first blending color format (e.g., the non-linear sRGB color format). For example, the converter unit 302 uses a transfer function for the sRGB color format to convert the pixels 102 into the sRGB color format. The converter unit 302 then provides the converted source layer pixels 102 in the non-linear sRGB color format to the alpha blending unit 306.

At step 716, the alpha blending unit 306 alpha blends the converted and normalized source layer pixels 102 and the first destination layer pixels 104 using the first alpha values 114 to generate the first alpha blended pixels 110. Then, the process 700 ends, and as described above, eventually, the logic 108 provides the first alpha blended pixels 110 for display on the display 112.

Among other technical benefits, some examples allow the original transparency level intended by an author or programmer of the user interface to be maintained. Further, in some instances, by allowing the original transparency level to be maintained, the image displayed on a display is improved. For example, by converting the source and/or first destination layer pixels 102, 104 prior to alpha blending, the alpha transparency optimization logic 108 preserves and/or maintains the transparency level of the images during alpha blending.

The above detailed description of the present disclosure and the examples described therein have been presented for the purposes of illustration and description only and not by limitation. It is therefore contemplated that the present disclosure covers any and all modifications, variations or equivalents that fall within the spirit and scope of the basic underlying principles disclosed above and claimed herein.

What is claimed is:

1. A method for alpha blending images from different color formats comprising:

obtaining, by logic, a plurality of source layer pixels, a plurality of first alpha values, a plurality of first destination layer pixels associated with the plurality of first alpha values, and information indicating a first blending color format for the first alpha values, wherein the first blending color format is different from both a first destination layer color format associated with the plurality of first destination layer pixels and different from an output color format associated with a display:

based on the information indicating the first blending color format for the first alpha values, converting, by the logic, at least one of the plurality of source layer pixels and the plurality of first destination layer pixels to the first blending color format for the first alpha values; and in response to the converting the least one of the plurality of source layer pixels and the plurality of first destination layer pixels, generating, by the logic, a plurality of first alpha blended pixels based on alpha blending the plurality of source layer pixels with the plurality of first destination layer pixels using the plurality of first alpha values.

2. The method of claim 1, wherein the first blending color format has a different luminance range than the first destination layer color format and different than the output color format and wherein the first blending color format comprises a first blending gamma space and a first blending set of color primaries, and wherein converting the at least one of the plurality of source layer pixels and the plurality of first destination layer pixels to the first blending color format comprises converting the at least one of the plurality of source layer pixels and the plurality of first destination layer pixels to the first blending gamma space using data representing a transfer function associated with the first blending gamma space.

3. The method of claim 2, wherein the first blending gamma space is a linear gamma space and the transfer function is a gamma transfer function.

4. The method of claim 1, wherein the first blending color format comprises a first blending gamma space and a first blending set of color primaries, and wherein converting the at least one of the plurality of source layer pixels and the plurality of first destination layer pixels comprises converting the at least one of the plurality of source layer pixels and the plurality of first destination layer pixels to the first blending set of color primaries using data representing one or more gamma transfer functions and one or more linear to linear transfer functions.

5. The method of claim 1, wherein the first blending color format comprises a first blending gamma space and a first blending set of color primaries, and wherein converting the at least one of the plurality of source layer pixels and the plurality of first destination layer pixels to the first blending color format comprises converting the at least one of the plurality of source layer pixels and the plurality of first destination layer pixels to the first blending gamma space and the first blending set of color primaries.

6. The method of claim 1, further comprising:

obtaining, by the apparatus, a plurality of second destination layer pixels associated with a plurality of second alpha values and information indicating a second blending color format, wherein the first blending color format is different from the second blending color format;

converting at least one of the plurality of first alpha blended pixels and the plurality of second destination layer pixels to the second blending color format; and in response to the converting the least one of the plurality of first alpha blended pixels and the plurality of second destination layer pixels, generating a plurality of second alpha blended pixels based on alpha blending the plurality of first alpha blended pixels with the plurality of second destination layer pixels using the plurality of second alpha values.

7. The method of claim 6, wherein the second blending color format comprises a second blending gamma space and a second blending set of color primaries, and wherein converting the at least one of the plurality of second alpha blended pixels and the plurality of second destination layer pixels to the second blending color format comprises converting the at least one of the plurality of first alpha blended pixels and the plurality of second destination layer pixels to the second blending gamma space using data representing a gamma transfer function associated with the second blending gamma space.

8. The method of claim 6, wherein the first blending color format comprises a first blending gamma space and a first blending set of color primaries, wherein the second blending color format comprises a second blending gamma space and a second blending set of color primaries, and wherein the first blending gamma space is different from the second blending gamma space.

9. The method of claim 6, wherein the first blending color format comprises a first blending gamma space and a first blending set of color primaries, wherein the second blending color format comprises a second blending gamma space and a second blending set of color primaries, and wherein the second blending gamma space is a same gamma space as the output color format.

10. The method of claim 6, wherein the second blending color format comprises a second intended gamma space and a second blending set of color primaries, and wherein converting the at least one of the plurality of first alpha blended pixels and the plurality of second destination layer pixels comprises converting the at least one of the plurality of first alpha blended pixels and the plurality of second destination layer pixels to the second blending set of color primaries using data representing one or more gamma transfer functions and one or more linear to linear transfer functions.

11. The method of claim 1, further comprising:

converting the plurality of first alpha blended pixels to the output color format; and providing for display the plurality of first alpha blended pixels on the display.

12. The method of claim 1, further comprising:

performing tone mapping for the plurality of first alpha blended pixels; and providing for display the plurality of first alpha blended pixels on the display.

13. The method of claim 1, wherein the converting the at least one of the plurality of source layer pixels and the plurality of first destination layer pixels comprises high dynamic ranges (HDR) tone mapping at least one of the plurality of source layer pixels and the plurality of first destination layer pixels.

14. An apparatus for alpha blending images from different color formats comprising:
alpha transparency optimization logic configured to:
obtain a plurality of source layer pixels, a plurality of first destination layer pixels, a plurality of first alpha values, associated with the plurality of first alpha values, and information indicating a first blending color format for the first alpha values, wherein the first blending color format is different from both a first destination layer color format associated with the plurality of first destination layer pixels and different from an output color format associated with a display;
based on the information indicating the first blending color format for the first alpha values, convert at least one of the plurality of source layer pixels and the plurality of first destination layer pixels to the first blending color format for the first alpha values; and
in response to the converting the least one of the plurality of source layer pixels and the plurality of first destination layer pixels, generate a plurality of first alpha blended pixels based on alpha blending the plurality of source layer pixels with the plurality of first destination layer pixels using the plurality of first alpha values.

15. The apparatus of claim 14, wherein the first blending color format has a different luminance range than the first destination layer color format and different than the output color format and wherein the first blending color format comprises a first blending gamma space and a first blending set of color primaries, and
wherein the alpha transparency optimization logic is configured to convert the at least one of the plurality of source layer pixels and the plurality of first destination layer pixels to the first blending color format by converting the at least one of the plurality of source layer pixels and the plurality of first destination layer pixels to the first blending gamma space using data representing a transfer function associated with the first blending gamma space.

16. The apparatus of claim 15, further comprising memory, wherein the memory stores the data representing the transfer function associated with the first blending gamma space, and wherein the first blending gamma space is a linear gamma space and the transfer function is a gamma transfer function.

17. The apparatus of claim 14, wherein the first blending color format comprises a first blending gamma space and a first blending set of color primaries, and
wherein the alpha transparency optimization logic is configured to convert the at least one of the plurality of source layer pixels and the plurality of first destination layer pixels to the first blending color format by converting the at least one of the plurality of source layer pixels and the plurality of first destination layer pixels to the first blending set of color primaries using data representing one or more gamma transfer functions and one or more linear to linear transfer functions.

18. The apparatus of claim 14, wherein the first blending color format comprises a first blending gamma space and a first blending set of color primaries, and
wherein the alpha transparency optimization logic is configured to convert the at least one of the plurality of source layer pixels and the plurality of first destination layer pixels to the first blending color format by converting the at least one of the plurality of source layer pixels and the plurality of first destination layer pixels to the first blending gamma space and the first blending set of color primaries.

19. The apparatus of claim 14, wherein the alpha transparency optimization logic is further configured to:
obtain a plurality of second destination layer pixels associated with a plurality of second alpha values and information indicating a second blending color format, wherein the first blending color format is different from the second blending color format;
convert at least one of the plurality of first alpha blended pixels and the plurality of second destination layer pixels to the second blending color format; and
in response to the converting the least one of the plurality of first alpha blended pixels and the plurality of second destination layer pixels, generate a plurality of second alpha blended pixels based on alpha blending the plurality of first alpha blended pixels with the plurality of second destination layer pixels using the plurality of second alpha values.

20. The apparatus of claim 19, wherein the second blending color format comprises a second blending gamma space and a second blending set of color primaries, and
wherein the alpha transparency optimization logic is configured to convert the at least one of the plurality of second alpha blended pixels and the plurality of second destination layer pixels to the second blending color format by converting the at least one of the plurality of first alpha blended pixels and the plurality of second destination layer pixels to the second blending gamma space using data representing a gamma transfer function associated with the second blending gamma space.

21. The apparatus of claim 19, wherein the first blending color format comprises a first blending gamma space and a first blending set of color primaries,
wherein the second blending color format comprises a second blending gamma space and a second blending set of color primaries, and
wherein the first blending gamma space is different from the second blending gamma space.

22. The apparatus of claim 19, wherein the first blending color format comprises a first blending gamma space and a first blending set of color primaries,
wherein the second blending color format comprises a second blending gamma space and a second blending set of color primaries, and
wherein the second blending gamma space is a same gamma space as the output color format.

23. The apparatus of claim 19, wherein the second blending color format comprises a second blending gamma space and a second blending set of color primaries, and
wherein the alpha transparency optimization logic is configured to convert the at least one of the plurality of second alpha blended pixels and the plurality of second destination layer pixels to the second blending color format by converting the at least one of the plurality of first alpha blended pixels and the plurality of second destination layer pixels to the second blending set of color primaries using data representing one or more gamma transfer functions and one or more linear to linear transfer functions.

24. The apparatus of claim 14, further comprising:
the display, and
wherein the alpha transparency optimization logic is further configured to:

convert the plurality of first alpha blended pixels to the output color format; and provide for display the plurality of first alpha blended pixels on the display.

25. The apparatus of claim 14, further comprising:
the display, and
wherein the alpha transparency optimization logic is further configured to:
perform tone mapping for the plurality of first alpha blended pixels; and
provide for display the plurality of first alpha blended pixels on the display.

26. The apparatus of claim 14, wherein the apparatus comprises:
a graphics processing unit (GPU) comprising a display engine, wherein the display engine comprises the alpha transparency optimization logic; and
memory comprising a first frame buffer and a second frame buffer, wherein the first frame buffer stores the plurality of source layer pixels, and wherein the second frame buffer stores the plurality of first destination layer pixels, the plurality of first alpha values, and the information indicating the first blending color format.

* * * * *